United States Patent [19]

Trainor et al.

[11] Patent Number: 5,552,696
[45] Date of Patent: Sep. 3, 1996

[54] MULTIPLE SETPOINT CONFIGURATION IN A VOLTAGE REGULATOR CONTROLLER

[75] Inventors: John J. Trainor, Wake Forest, N.C.;
Michael A. Bellin, Brandon, Miss.;
Carl J. Laplace, Jr., Raleigh, N.C.

[73] Assignee: Siemens Energy & Automation, Inc., Alpharetta, Ga.

[21] Appl. No.: 198,976

[22] Filed: Feb. 18, 1994

[51] Int. Cl.$^6$ .............................. G05F 1/565; G05F 1/14; H02J 3/12
[52] U.S. Cl. ..................... 323/275; 323/255; 323/340
[58] Field of Search .................. 323/274, 275, 323/284, 285, 282, 283, 349, 351, 255, 258, 340; 364/492, 493

[56] References Cited

U.S. PATENT DOCUMENTS

| | | | |
|---|---|---|---|
| 4,573,127 | 2/1986 | Korff | 364/493 |
| 4,878,009 | 11/1989 | Esser et al. | 323/275 |
| 5,229,713 | 7/1993 | Bullock et al. | 324/142 |
| 5,450,002 | 9/1995 | Dunk | 323/257 |
| 5,455,505 | 10/1995 | Laplace et al. | 323/343 |

*Primary Examiner*—Peter S. Wong
*Assistant Examiner*—Bao Q. Vu

[57] ABSTRACT

A voltage regulator controller including means for creating multiple regulator setpoint configurations. Configurations can be selected upon demand, by time/date activation, or by an external trigger source.

23 Claims, 5 Drawing Sheets

MULTIPLE SETPOINT CONFIGURATION IN A VOLTAGE REGULATOR CONTROLLER

I. BACKGROUND OF THE INVENTION a. Field of the Invention

This invention relates to voltage regulators and related control systems.

b. Related Art

A step type voltage regulator is a device which is used to maintain a relatively constant voltage level in a power distribution system. Without such a regulator, the voltage level of the power distribution system could fluctuate significantly and cause damage to electrically powered equipment.

A step-type voltage regulator can be thought of as having two parts: a transformer assembly and a controller. A conventional step-type voltage regulator transformer assembly 102 and its associated controller 106 are shown in FIG. 1. The voltage regulator transformer assembly can be, for example, a Siemens JFR series. The windings and other internal components that form the transformer assembly 102 are mounted in an oil filled tank 108. A tap changing mechanism (not shown) is commonly sealed in a separate chamber in the tank 108.

The various electrical signals generated by the transformer are brought out to a terminal block 110 and external bushings S, SL, L for access. The terminal block is preferably covered with a waterproof housing. An indicator 112 is provided so that the position of the tap as well as its minimum and maximum positions can be readily determined.

A cabinet 114 is secured to the tank to mount and protect the voltage regulator controller 106. The cabinet 114 includes a door (not shown) and is sealed in a manner sufficient to protect the voltage regulator controller 106 from the elements. Signals carried between the transformer or tap changing mechanism and the voltage regulator controller 106 are carried via an external conduit 116.

The tap changing mechanism is controlled by the voltage regulator controller 106 based on the controller's program code and programmed configuration parameters. In operation, high voltage signals generated by the transformer assembly 102 are scaled down for reading by the controller 106. These signals are used by the controller 106 to make tap change control decisions in accordance with the configuration parameters and to provide indications of various conditions to an operator.

The regulator control configuration parameters are commonly referred to as "setpoints". These setpoints typically include forward and reverse settings for voltage level thresholds, bandwidth and time delay. The setpoints can also include settings for upper and lower voltage limit control.

II. SUMMARY OF THE INVENTION

In accordance with the present invention, a voltage regulator controller includes means for defining a plurality of independent sets of regulator control parameters and means for defining a condition under which each particular set of the regulator control parameters will be used to control operation of the voltage regulator. In a preferred embodiment, the control parameter set can be selected upon demand, by time/date activation, or by an external trigger source.

III. BRIEF DESCRIPTION OF THE DRAWINGS

Like reference numerals appearing in more than one figure represent like elements.

IV. DETAILED DESCRIPTION OF THE PREFERRED EMBODIMENT

An embodiment of the present invention will now be described by reference to FIGS. 2 through 5.

Figure 3:
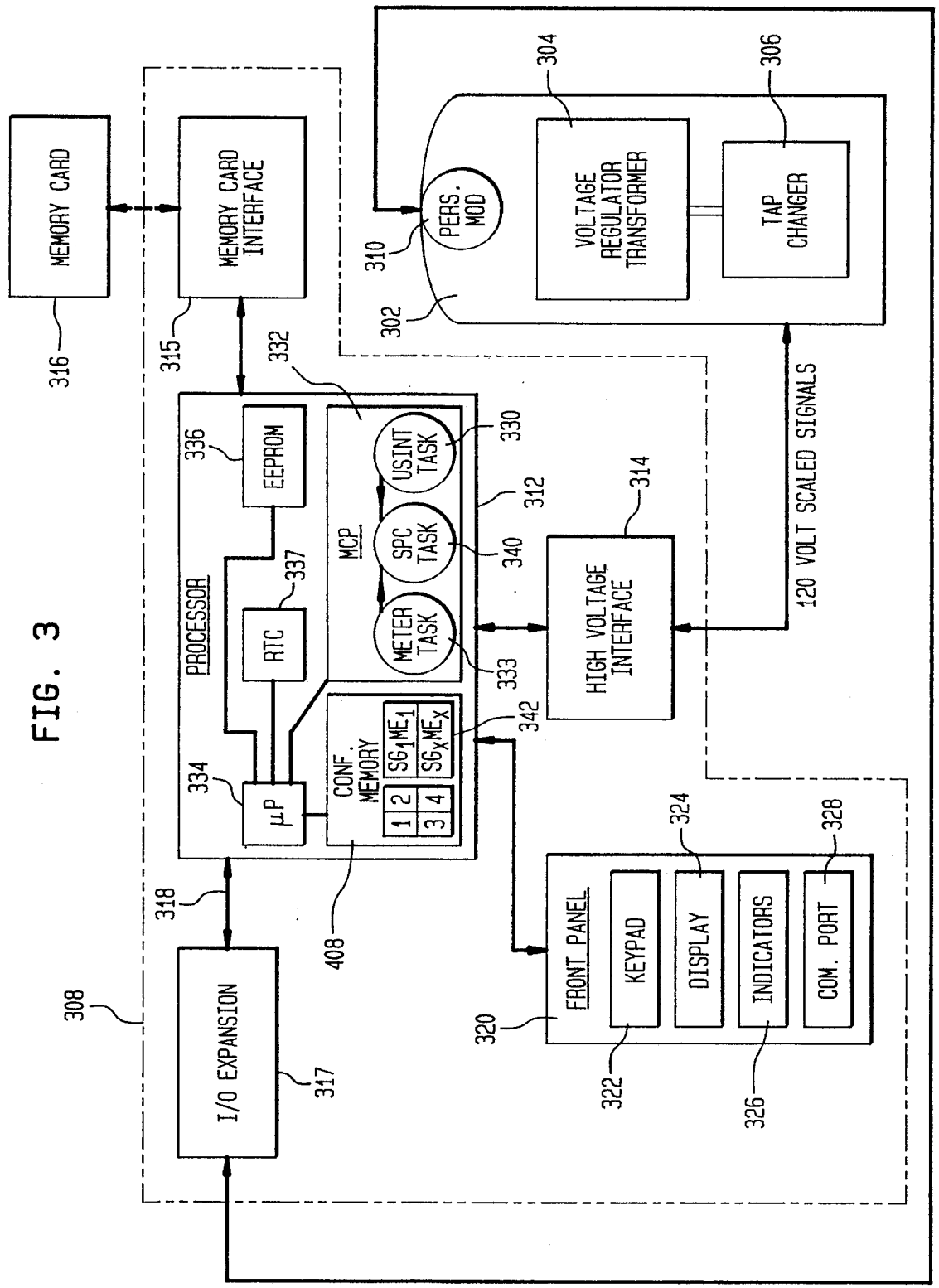
FIG. 3 is a block diagram of a voltage regulator controller in accordance with an embodiment of the present invention.

A step-type voltage regulator and its associated controller according to an embodiment of the present invention are shown in FIG. 3. The voltage regulator transformer assembly 302 can be, for example, a Siemens JFR series but in any event is of a conventional type which includes a multi-tap transformer 304 and an associated tap changer (tap changing mechanism) 306. The tap changer 306 is controlled by the voltage regulator controller 308 which receives signals indicative of voltage and current in the windings of the transformer 304 and conventionally generates tap control signals in accordance with operator programmed setpoints and thresholds for these signals. The voltage regulator 302 can also be provided with a non-volatile memory (personality module) 310 which stores statistics and historical information relating to the voltage regulator.

The voltage regulator controller 308 includes a processor section (processor board) 312, a high voltage interface 314, a PCMCIA memory card interface 315 (for receiving a conventional PCMCIA standard memory card 316), an I/O expansion chassis (rack) 317 which is coupled to the processor section 312 by way of a bus 318 and a front panel 320 which is coupled to the processor section.

The front panel 320 provides an operator interface including a keypad 322, a character display 324, indicators 326 for various regulator conditions and a serial communications port (local port) connector 328. A user interface task (usint) 330 running under the processor sections main control program (mcp) 332 monitors activity on the keypad 322 and provides responses to the character display 324 as needed. The front panel 320, its associated operator interface and the user interface task 330 can be of the type described in U.S. patent application Ser. No. 07/950,402; filed on Sep. 23, 1992, which is incorporated by reference in its entirety as if printed in full below.

Parametric data such as instantaneous values for the load voltage, load current, power factor, real power, reactive power, apparent power, source voltage and the instantaneous tap position; are monitored and updated periodically by a metering (mtr) task 333 running under the main control program 332. This parametric data is stored in a configuration and data memory 408 coupled to the processor section's microprocessor (uP) 334. In accordance with an embodiment of the present invention, the metering task 333 also maintains in the data and configuration memory, separate tallies 1–4 for forward lead Kilovolt-Ampere Reacted (KVAR) hours, forward lag KVAR hours, reverse lead KVAR hours and reverse lag KVAR hours. A separate KVAR hour total with a sign ("+" or "31") can also be determined from the separate tallies. The separate tallies 1–4 and the KVAR hour total (with sign) are accessible by a operator via the front panel display or the communications port.

The processor section 312 generates digital control signals based on internal program code and operator selected parameters entered (by an operator) via the controllers front panel 320. The processor section 312 is controlled by the microprocessor 334. An EEPROM 336 coupled to the up provides a non-volatile storage area for parametric data (including setpoints) and other working data. This data is downloaded to the configuration and data memory (which can be embodied as a static random access memory) by the microprocessor 334 when the processor section 312 is initialized. The SRAM copy is used, by the microprocessor, as the working copy of the configuration data. A real time clock (RTC) 337 provides the processor with data indicative of the time, date and day of the week.

In operation, high voltage signals are generated by the voltage regulator transformer 304. These signals are scaled down via internal transformers (not shown) and provided to the high voltage interface 314. The high voltage interface 314, in turn, further scales the transformed down signals for reading by an analog to digital converter (shown in FIG. 4) within the processor section 312. The data fed back from the voltage regulator 302 is used by the processor section 312 to make tap change control decisions and to provide indication of various conditions to an operator.

In accordance with an embodiment of the present invention, a setpoint control (spc) task 340 running under the main control program monitors operator selected operating conditions (setpoint modifying events) which, should they occur, cause the setpoint values to change. When the setpoint control task 340 detects the setpoint modifying events it causes the main control program to substitute one of a plurality of alternate groups of setpoint values for the currently used setpoint values.

When the operator activates multiple setpoint control, the setpoint control task monitors controller activities and inputs for pre-defined setpoint modifying events. Depending on how the multiple setpoint control is configured, the spc task monitors one or more of the following activities:

1) configuration changes that effect multiple setpoint control,
2) the time and day of week, and
3) external events which may be used to trigger the setpoint modifying algorithm to change the setpoints.

In addition, other pre-defined setpoint modifying events can be identified. These can include pre-set values or ranges for metered parameters such as load voltage, source voltage, power factor, load current, and tap position.

The operator enables multiple setpoint control by configuring the voltage regulator controller via the keypad 322 and the character display 324. The operator enters configuration data via the keypad 322 while viewing the configuration data on the character display 324. The user interface task 330 monitors keypad activity and provides responses to the character display as needed.

When the operator changes the configuration data (e.g., for the multiple setpoint control set-up), the user interface task 330 modifies the corresponding configuration data stored in the EEPROM 336. This revised configuration data is then accessible by the setpoint control task for determining which setpoint modifying events to monitor for changing the setpoint values. The setpoint group (SG) definitions and the corresponding setpoint modifying event (ME) definitions are copied into a table 342 in the configuration memory when the voltage regulator controller is initialized. The uP 334 (and the setpoint control task) then uses the configuration memory copy as the working copy.

Similarly, the operator can enable multiple setpoint control by electronically configuring the voltage regulator controller via the communications port 328 or a communications port interface on the I/O Expansion Chassis 317.

The operator sets the time and day of week for which new setpoint values are to be substituted. Several time/day-of-week values may be specified. For each time/day-of-week value entered, the operator also selects which group of setpoint parameters is to be substituted. Time and calendar dates can also be jointly used to specify the moment for changing the selected setpoint parameter group. Thus, the setpoint parameter substitutions can be repeated (by the controller) on the same date and time during subsequent years.

Once the operator sets the time/day-of-week values for setpoint parameter substitutions, the setpoint modifying algorithm starts monitoring the real time and day-of-week using the real time clock 337. When the matching time and day-of-week occurs, the setpoint modifying algorithm causes the main control program to activate the new setpoint group specified in the multiple setpoint control configuration data.

The specific setpoint modes are selected by way of the front panel using the keyboard and display. In accordance with an embodiment of the present invention, an operator selects configuration choices from a menu displayed on the front panel display. Specifically, the choices are:

1. Multi-Setpoint Mode
2. Local Setpoint Group Select
3. Setpoint Group Definition
4. Automatic Multi-Setpoint Control;
5. Remote Multi-Setpoint Control.

When "Multi-Setpoint Mode" is selected an option list is displayed which prompts the operator to select the operating mode of the multiple setpoint function from a number of displayed options. The options are: Off, Local, Automatic, and Automatic with Remote Override. When set to Off, single setpoint configuration (the default) is enabled.

When "Local Setpoint Group Select" is selected the operator is prompted to select the active setpoint group for Local control. Choices are SG1-SGx. Local control can be used to quickly select one group of setpoints from a set of previously entered setpoint groups.

When "Setpoint Group Definition" is selected the operator is prompted to define the SG parameters. A fixed number (x) SGs are allowed. (e.g. 6)

The "Automatic Multi-Setpoint Control" option prompts the operator to enter one or more entries, each including a Day, Time and Setpoint Group. If the Multi-Setpoint Mode= Automatic, these settings enable programming of Multi-Setpoint control by time and day-of-week. A fixed number (x) of settings are allowed. (e.g. 6).

When "Remote Multi-Setpoint Control" is selected the operator is prompted to specify an external trigger and a setpoint group. If Multi-Setpoint Mode=Auto with Remote Override, the regulator controller selects the specified setpoint group when the specified external trigger occurs. In this mode, if none of the operator specified signals are active, multi-setpoint control reverts to Automatic control (i.e., Time/Day based control).

Figure 1:
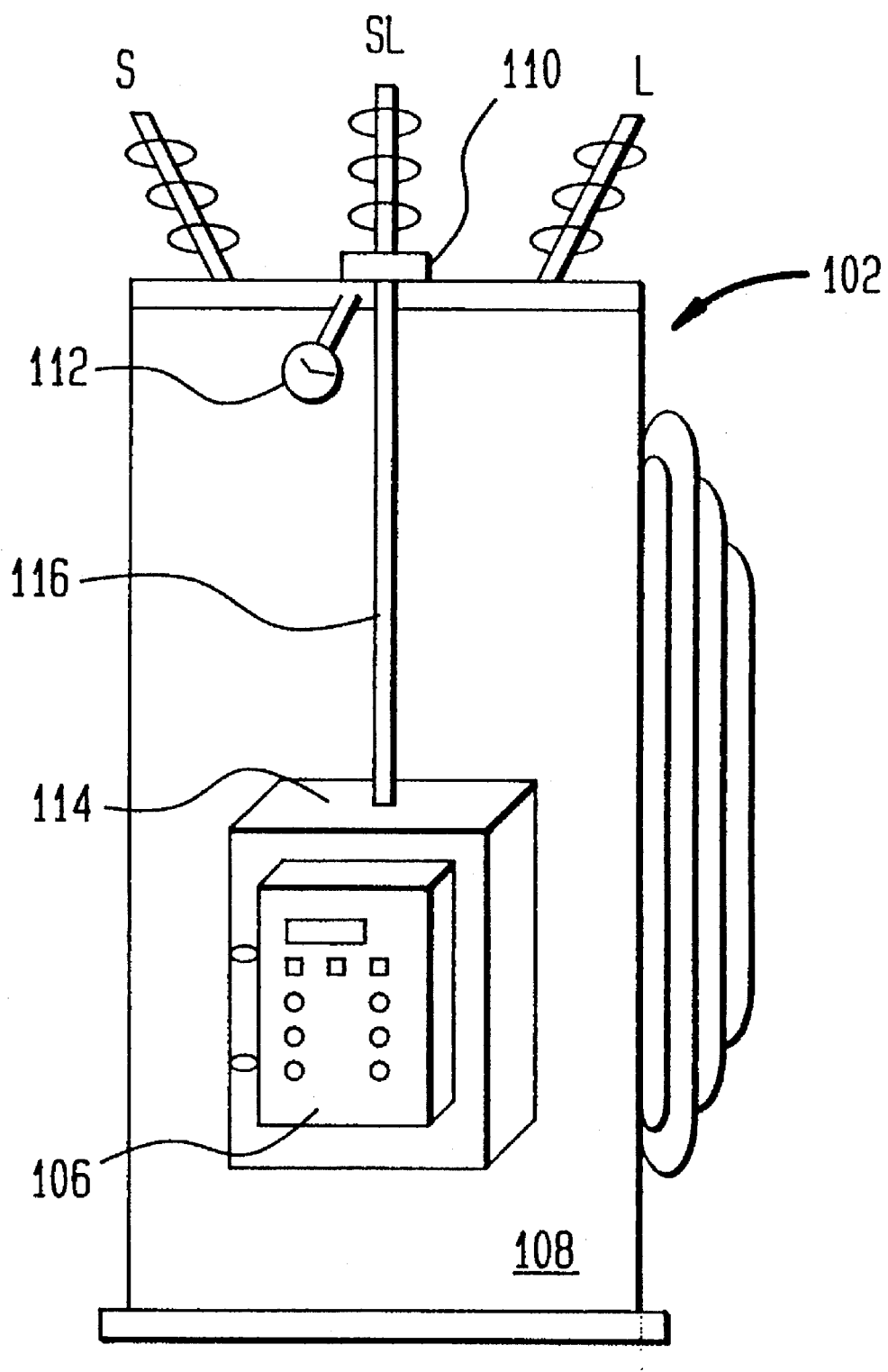
FIG. 1 shows a conventional voltage regulator transformer assembly and controller.
Figure 2:
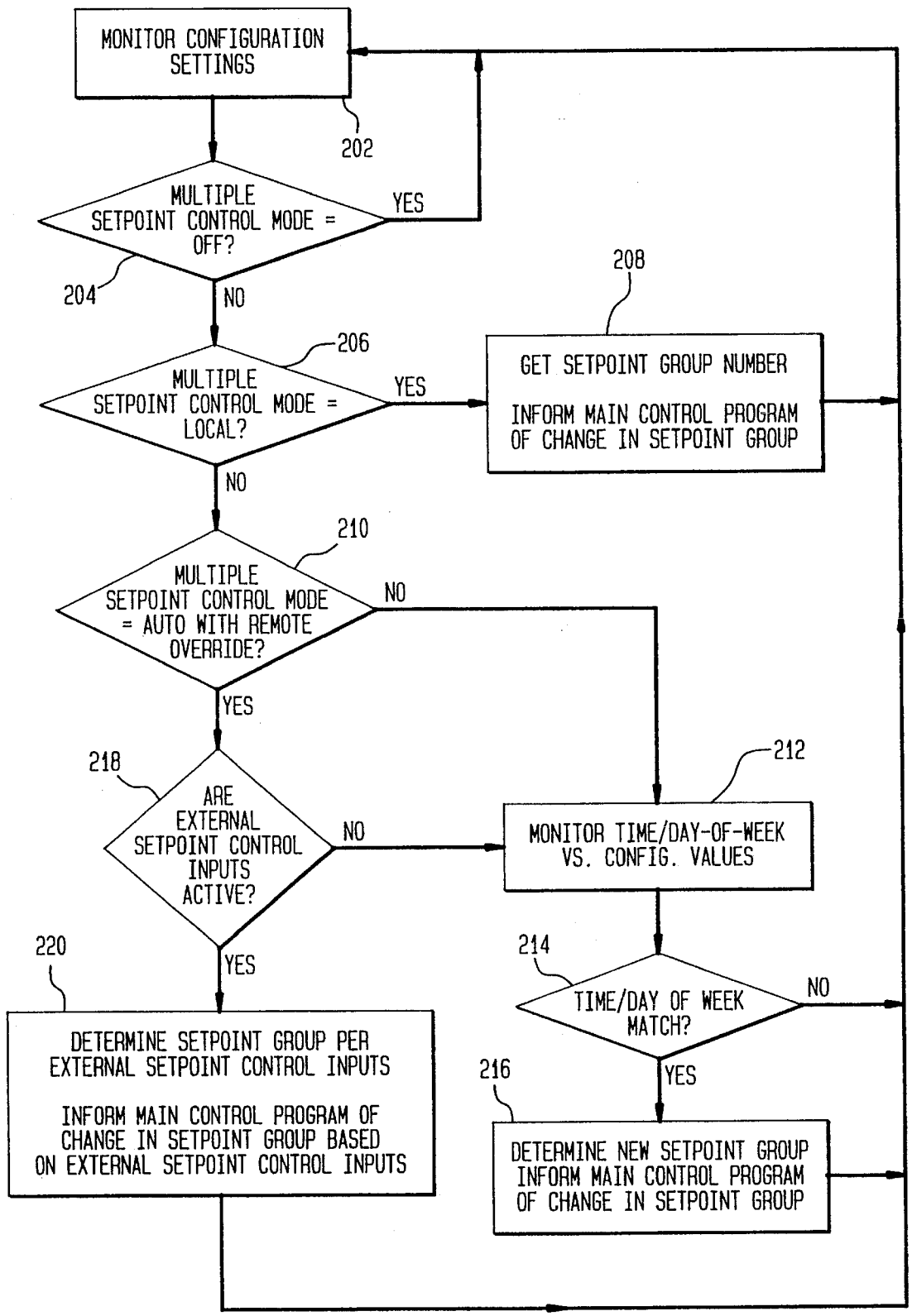
FIG. 2 is a flow chart of a setpoint control task according to an embodiment of the present invention.

The setpoint control task 340 will now be described in more detail by reference to FIG. 2.

In step 202, the setpoint control task monitors the configuration setting (stored in the controller's configuration memory) selected by an operator via the user interface task. In step 204 the setpoint control task examines the configuration setting to determine whether Multiple Setpoint Control Mode (MSCM) is ON. If Multiple Setpoint Control Mode is turned OFF, the multiple setpoint mode is not enabled and the setpoint control task remains dormant except for monitoring the configuration memory for Multiple Setpoint Control Mode to be turn ON.

If, in step 204, the setpoint control task determines that MSCM is ON, in step 206 the setpoint control task determines whether MSCM is set to LOCAL. If yes, in step 208 the setpoint task gets the setpoint group number from the configuration parameter memory and informs the main control program of any changes in the setpoint group. If no, in step 210 the setpoint control task determines whether MSCM is set for Auto with Remote Override.

If Auto with Remote Override is not set, in step 212 the setpoint control task commences monitoring of the time and day of week and in step 214 checks these against the multiple setpoint configuration parameters stored in the configuration memory 206. The time and day of the week can be determined by way of the real time clock 337 or by a time and day tracking mechanism internal to the processor.

If, in step 214, the setpoint control task determines that the time and day of week match the configuration parameters, in step 216 the task signals the main control program to change to the new operator selected setpoint group (stored in the configuration memory)

If Auto with Remote Override is set, in step 218 the setpoint task determines if any of the external setpoint control inputs defined in the configuration parameters are active. If no, the setpoint control task executes steps 212–216. If yes, in step 220 the setpoint control task determines the setpoint group to select based on the external control inputs and signals the main control program to change to the select setpoint group determined.

An example of Auto with Remote Override setpoint group selection will now be described. Assume three external signals (A, B and C) are being monitored (for example three control signals generated by a remote computer). Also assume that the data shown in Table 1 has been stored in the configuration memory in response to an operator programming the controller.

TABLE 1

| A | B | C | Setpoint-Group |
|---|---|---|---|
| 0 | 0 | 1 | SG1 |
| 0 | 1 | 0 | SG2 |
| 0 | 1 | 1 | SG3 |
| 1 | 0 | 0 | SG4 |
| 1 | 0 | 1 | SG5 |
| 1 | 1 | 0 | SG6 |
| 1 | 1 | 1 | SG7 |

When Auto with Remote Override is set, the setpoint task will commence monitoring inputs A, B and C and select a setpoint group in accordance with Table 1. If, for example, only C is active (set to 1) setpoint group SG1 will be selected. If, for example, none of A, B or C are active (A=0, B=0 and C=0), the setpoint task will revert to Time/Day based control.

As previously discussed, in contrast to conventional KVAR meters which accumulate and record the total KVAR hours (lead and lag) and do not keep separate tallies for forward and reverse KVAR hours, according to an embodiment of the present invention however, the voltage regulator controller maintains separate tallies for forward KVAR hours (lead), forward KVAR hours (lag), reverse KVAR hours (lead) and reverse KVAR hours (lag). A separate total with a sign (±) can also be maintained. These totals are independently accessible by a user via the front panel display or a communications port.

For power systems, the reactive component of the power represents losses in the system. Measuring this loss is a first step in helping to reduce it. Breaking the KVAR hour measurement into its constituent elements assures that, over time, the leading and lagging reactive energies accumulate rather than cancel each other out. Electric utilities can use the KVAR hour measurements to improve the design of their distribution systems.

Power flow direction is determined by the sign of the real power (Watts.) When the real power is positive, the power flow direction is considered to be "Forward", while if the real power is negative, the power flow direction is "Reverse". In the voltage regulator controller of FIGS. 3 and 4, the formulas for determining Watts, Reactive Power (VARs) and the Power Factor(PF) are shown below, where N is the number of samples taken per cycle and t is the total sampling time.

$$\text{Watts} = \sum_{1}^{N} V(t) \times I(t)$$

$$VARs = \frac{1}{N} \sum_{1}^{N} V(t) \times I(t + 90°)$$

$$PF = SGN(VARS) \times \frac{\text{WATTS}}{VA}$$

The voltage-to-current phase angle is determined from the values of the real power (Watts) and the apparent power (VA). The apparent power, VA (Volt-Amperes), is the product of the Root-Mean-Square (RMS) Current and RMS voltage. From the phase angle, the quadrant of the voltage/current relationship can be determined as illustrated in FIG. 5.

Figure 5:
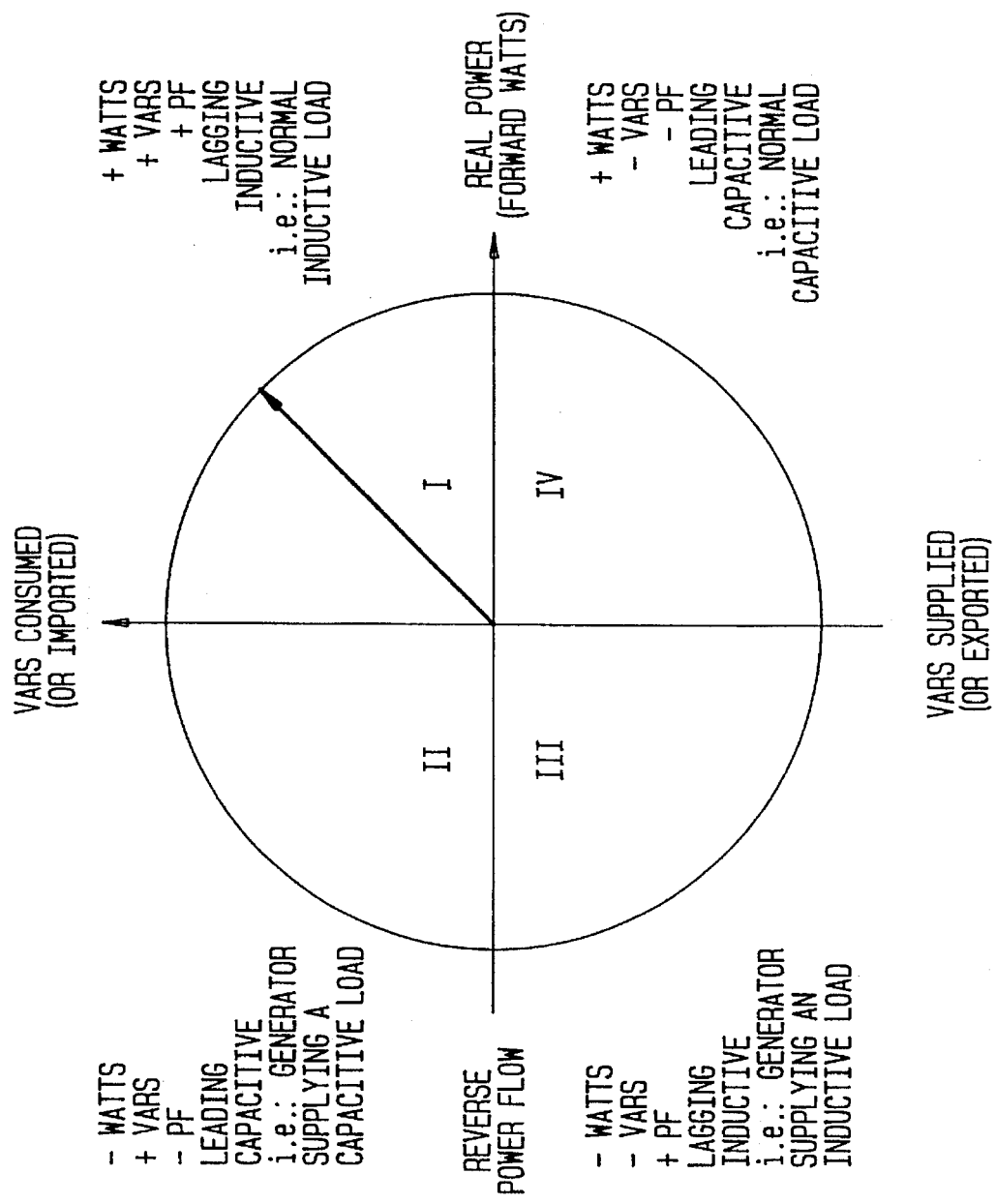

The direction of power flow in FIG. 5 is load referenced. That is to say that positive power flows into the load and negative power flows out of the load. FIG. 5 assumes that the voltage and current are sinusoidal, 50 to 60 Hertz. In Quadrant I, Watts, VARs and the Power Factor (PF) are all positive. This condition is lagging and inductive (i.e. normal inductive load on the voltage regulator transformer 304). In Quadrant IV Watts are positive while VARs and the Power Factor are negative. This condition is leading and capacitive (i.e., normal capacitive load). In Quadrant II, Watts and the Power Factor are negative and VARs are positive. This condition is leading and capacitive (i.e. the load is a generator consuming VARs). In Quadrant III, Watts and VARs are negative and the Power Factor is positive. This condition is lagging and inductive (i.e. the load is a generator supplying VARs). For each of the quadrants, a separate location 1–4 is provided in the configuration and data memory to maintain the corresponding KVAR hour tallies).

Typically, the reactive power runs in the 1000s to 100, 000s, so it is represented as KVARs (Kilo-Volt-Ampere-Reactive). KVAR-Hours (KVARhr) are calculated by taking the product of the KVAR value and the time increment over which it is measured. For example, the KVARhr value can be updated once per second, using the formula:

KVARHRnew=KVARHRold+KVAR*1/3600 (hours)

For each new KVARhr measurement, the regulator controller determines which of the four KVARhr memory locations 1–4 (referred to as "bins") to increment, based on the quadrant of the current/voltage phase angle. The bins for KVARhr parameters are accumulated as follows:

| Bin | Parameter | Quadrant |
|---|---|---|
| 1 | Forward KVARhr lead | IV |
| 2 | Forward KVARhr lag | I |
| 3 | Reverse KVARhr lead | II |
| 4 | Reverse KVARhr lag | III |

The present invention may be embodied as an improvement to the base circuitry and programming of an existing microprocessor based voltage regulator controllers. An example of a controller having suitable base circuitry and programming is the Siemens MJ-X voltage regulator controller, available from Siemens Energy and Automation, Inc. of Jackson, Miss., U.S.A.

Figure 4:
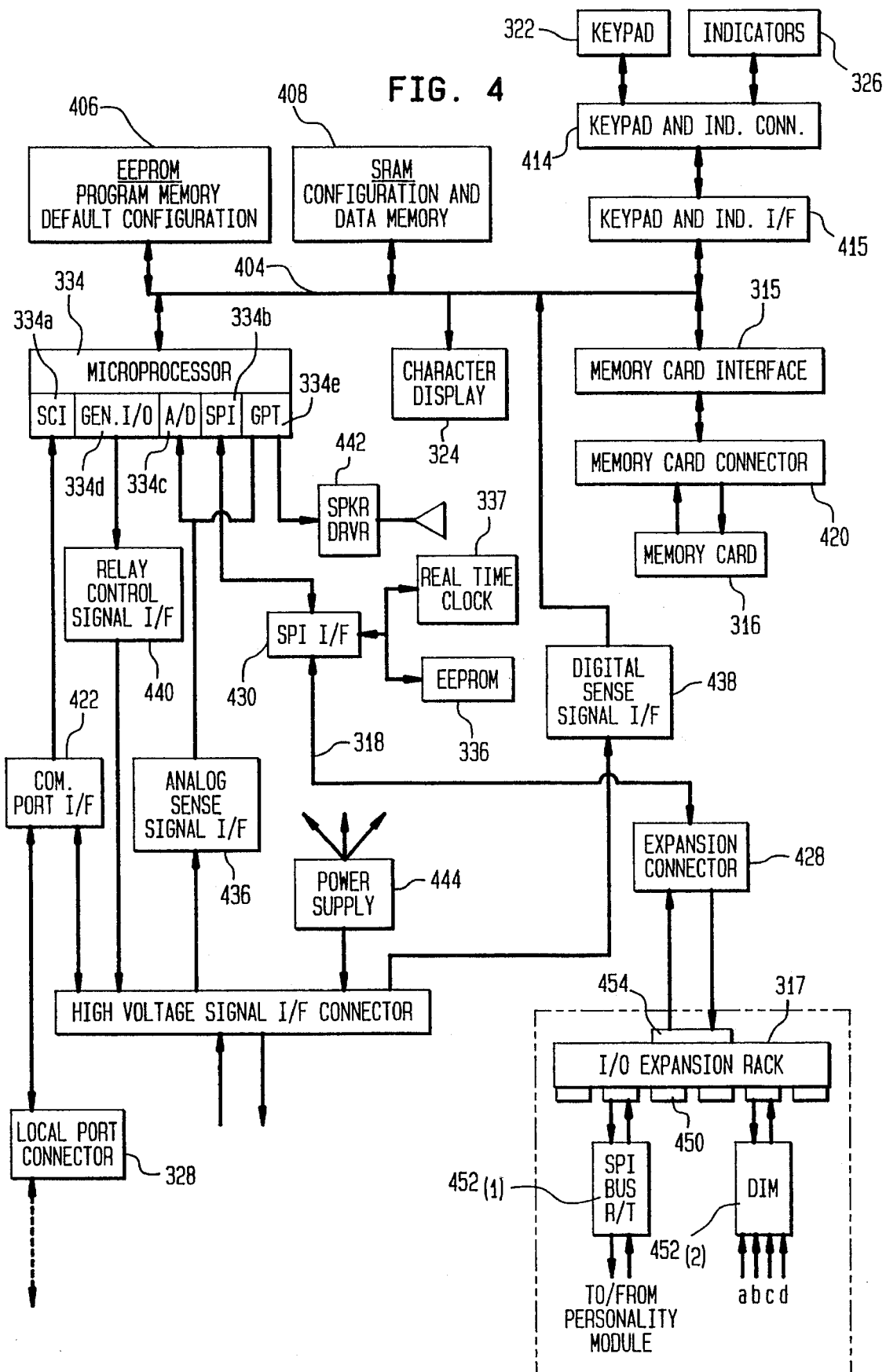
FIG. 4 is a more detailed diagram of the processor board of FIG. 3 showing its interconnection to other components of the voltage regulator controller; and, FIG. 5 shows the quadrant of the voltage/current relationship for given phase angles.

A more detailed block diagram of the processor section 312 and its interconnection to other elements of the voltage regulator controller is illustrated in FIG. 4.

The processor section 312 includes the microprocessor 334 (for example, a Motorola 68HC16) which is coupled to the other processor elements by way of a common bus 404. An electrically erasable programmable read only memory (EEPROM) 406 includes the microprocessor's program instructions and default configuration data. The main control program, including the setpoint modifying software algorithm, reside in the EEPROM 406. The microprocessor 334 executes instructions from the EEPROM 406 to perform normal operations of the voltage regulator controller 308.

A static type random access memory (SRAM) 408 stores operator programmed configuration data and includes areas for the microprocessor 334 to store working data and data logs. The working data includes parametric data such as load and source voltage, power factor, load current, tap position, etc. These parameters are updated periodically by the metering or other tasks running under the main control program.

The microprocessor 334 also communicates with the alphanumeric character display 324, the keypad 322 and indicators 326 and the memory card interface 315 via the bus 404.

The keypad 322 and indicators 326 are coupled to the bus 404 via a connector 414 and a bus interface 415. As previously described, a memory card 316 can be coupled to the bus 404 by way of a conventional PCMCIA standard interface 315 and connector 420.

Operational parameters, setpoints and special functions including metered parameters, log enables, log configuration data and local operator interfacing are accessed via the keypad 322. The keypad is preferably of the membrane type however any suitable switching device can be used. The keypad provides single keystroke access to regularly used functions, plus quick access (via a menu arrangement) to all of the remaining functions.

The microprocessor 334 includes an SCI port 334a which is connected to a communication port interface 422. The communication port interface 422 provides the SCI signals to the external local port 338 on the controller's front panel 320. An isolated power supply for the communication port interface 422 is provided by the high voltage interface 314 via a high voltage signal interface connector 426.

The communication port interface 422 supports transfer of data in both directions, allowing the controller to be configured via a serial link, and also provides meter and status information to a connected device. In addition to supporting the configuration and data retrieval functions required for remote access, the communication port interface 422 supports uploading and/or downloading of the program code for the microprocessor 334.

The communication port interface 422 can be, for example, an RS-232 compatible port. The local port connector 328 can be used for serial communication with other apparatus, for example a palmtop or other computer. The physical interface of the local port connectors 328 can be a conventional 9-pin D-type connector whose pin-out meets any suitable industry standard.

The microprocessor 334 also includes an SPI port 334b which is connected to an expansion connector 428 by way of an SPI interface 430. The expansion connector brings the SPI bus 318 out to the I/O expansion chassis 317 via a cable. Other devices that reside on the SPI bus include the real time clock 337 and the serial EEPROM 336. The real time clock can be used to provide the time and date and data indicative of the passage of programmed time intervals. The serial EEPROM 336 stores operator programmed configuration data (including the setpoint configuration) and other working data. The operator programmed configuration data is downloaded to the SRAM 408 by the microprocessor 334 when the processor section 312 is initialized. The SRAM copy is used, by the microprocessor, as the working copy of the configuration data. The real time clock 337 is programmed and read by the microprocessor 334.

The high voltage signal interface connector 426 provides a mating connection with a connector on the high voltage interface 314. Scaled analog signals from the high voltage interface 314 are provided to an A/D converter port 334c by way of an analog sense signal interface 436. The analog sense signal interface 436 low pass filters the scaled analog input signals prior to their provision to the A/D converter port 334c. Digital signals from the high voltage interface 314 are provided to the bus 404 via a digital sense signal interface 438. The digital sense signal interface 438 provides the proper timing, control and electrical signal levels for the data.

Control signals from the microprocessor's general I/O port 334d are provided to the high voltage signal interface connector 426 by way of a relay control signal interface 440. The relay control signal interface converts the voltage levels of the I/O control signals to those used by the high voltage interface 314. A speaker driver 442 is connected to the GPT port 334e of the microprocessor 334. The processor section 312 also includes a power supply 444 which provides regulated power to each of the circuit elements of the processor section 312 as needed. The high voltage interface 314 provides an unregulated power supply and the main 5 volt power supply for the processor section 312.

The microprocessor 334 recognizes that a memory card 316 has been plugged into the memory card interface 315 by monitoring the bus 404 for a signal so indicating. In response, the microprocessor 334 reads operator selected control parameters entered via the controller's keypad 322. Depending on the control parameters, the microprocessor either updates the programming code in its configuration EEPROM 406, executes the code from the memory card 316 while it is present but does not update its EEPROM 406, or dumps selected status information to the memory card 316 so that it can be analyzed at a different location. As an alternative embodiment, the processor section 312 can be programmed to default to the memory card program when the presence of a memory card is detected. In this case, upon detection, the program code from the memory card would be downloaded to the SRAM 408 and executed by the microprocessor from there.

The I/O expansion chassis (rack) 317 includes a number (e.g. 6) of connectors 450 for receiving field installable, plug-in I/O modules 452. The connectors 450 are electrically connected to the SPI bus 318 via a common processor section interface connector 454 and couple the I/O module(s) 452 (1), 452 (2) to the SPI bus 318 when they are plugged into the chassis.

The processor section 312 can communicate with the personality module 310 in a number of ways. For example, the microprocessor 334 can be provided with conventional RS-232 interface circuitry to the SCI bus. A conventional RS-232 cable can then be used to connect this RS-232 interface to an RS-232 interface on the personality module. Alternatively, an I/O module (SPI BUS R/T) in the I/O expansion chassis can provide the physical and electrical interface between the SPI bus 318 and a cable connected to the personality module. An SPI R/T or other communications port can also be used to provide outside access to the controller's data logs and configuration parameters otherwise accessible on the front panel.

For Multiple Setpoint control, the processor section receives discrete inputs for the Auto with Remote Override function by way of a Discrete Input Module 452 (2) plugged into the I/O Expansion Chassis 317. The Discrete Input Module is a parallel to serial converter that monitors the states of discrete signals a–d provided by one or more external sources and converts the state information into serial data for monitoring by the microprocessor 334 by way of the SPI bus 318.

Now that the invention has been described by way of the preferred embodiment, various modifications, enhancements and improvements which do not depart from the scope and spirit of the invention will become apparent to those of skill in the art. Thus, it should be understood that the preferred embodiment has been provided by way of example and not by way of limitation. The scope of the invention is defined by the appended claims.

We claim:

1. A method for operating a voltage regulator controller comprising the steps of:

defining a plurality of independent sets of discrete regulator control parameters and storing each of the sets in a processor driven table;

for each of the sets, defining a condition under which a particular set of the regulator control parameters in said table will be identified to control operation of the voltage regulator;

monitoring the regulator for the conditions defined for each set of the regulator control parameters; and, when one of the conditions occurs, operating a voltage regulator in accordance with the defined regulator control parameters which are identified in said table with the one condition.

2. The method of claim 1 comprising the further step of: in response to the condition occurring, selecting a new condition for monitoring.

3. The method of claim 1 comprising the further step of: in response to the condition occurring, selecting a different set of the regulator control parameters and a new condition for monitoring.

4. The method of claim 1 wherein the condition is an operator selected time of day.

5. The method of claim 1 wherein the condition is an assertion of at least one operator selected input signal provided by a remote device.

6. The method of claim 1 wherein the condition is any of an operator selected time of day and an assertion of at least one operator selected input signal provided by a remote device.

7. The method of claim 6 wherein when at least one operator selected input signal is asserted, the regulator controller selects the set of regulator control parameters responsive thereto and overrides at least some of the regulator control parameters selected in accordance with the time of day.

8. A voltage regulator controller comprising:

operator input means for a) defining a plurality of independent sets of discrete regulator control parameters, b) storing each of the sets in a processor driven table, and c) for each one set of the sets, defining a condition under which the one set of regulator control parameters will be identified to control operation of the voltage regulator;

a memory including the processor driven table for storing the sets of regulator control parameters and the conditions;

monitor means for monitoring the regulator for one of the conditions defined for the sets of the regulator control parameters; and, control means coupled to the monitor means and the memory for, when the one condition occurs, for operating a voltage regulator in accordance with the defined regulator control parameters which are identified in said table with the one condition.

9. The voltage regulator controller of claim 8 further comprising a memory for storing groups of operational setpoints and wherein each of the sets of regulator control parameters comprise a group of the setpoints.

10. The voltage regulator controller of claim 8 wherein the control means further comprises means for selecting a new condition for monitoring when a previously specified condition occurs.

11. The voltage regulator controller of claim 8 wherein the control means further comprises means for, in response to the condition occurring, selecting a different set of the regulator control parameters and a new condition for monitoring.

12. The voltage regulator controller of claim 9 wherein the monitoring means further comprises means for monitoring a plurality of discrete inputs from at least one remote source and wherein the control means selects a group of the setpoints with which to operate the voltage regulator controller responsive to a present state of the discrete inputs.

13. The voltage regulator controller of claim 9 further comprising a real time clock and wherein the control means selects a group of the setpoints with which to operate the voltage regulator controller responsive to operator selected times of day supplied by the real time clock.

14. The voltage regulator controller of claim 8 further comprising metering means for measuring KVAR hours supplied and consumed by a load coupled to the voltage regulator and storage means coupled to the metering means for storing separate tallies for forward lead KVAR hours, forward lag KVAR hours, reverse lead KVAR hours and reverse lag KVAR hours.

15. The voltage regulator controller of claim 14 further comprising means for determining total lead and lag KVAR hours and for displaying the total lead and lag KVAR hours to an operator of the voltage regulator controller.

16. A voltage regulator controller comprising:

clock means for determining a time of day;

operator input means for defining a plurality of independent groups of regulator setpoints and storing each of the groups in a processor driven table and for each of the groups, defining the time of day under which a given group of the regulator setpoints in said table will be identified to control operation of the voltage regulator;

a memory for storing the groups of the regulator setpoints and times of day when the groups of regulator setpoints will be used to control the operation of the voltage regulator; and, control means, coupled to the memory and the clock means, for determining when the time of day has occurred to change the group of regulator setpoints and for operating a voltage regulator in accordance with the group of regulator setpoints which are identified in said table as being associated with the time of day that has occurred.

17. The voltage regulator controller of claim 16 further comprising means for monitoring a plurality of discrete inputs from at least one remote source; and, means for storing in the memory, groups of the regulator setpoints associated with operator selected combinations of the discrete inputs, wherein when an operator selected combination of the discrete inputs is occurs, the control means selects the group of the regulator setpoints associated therewith to control operation the voltage regulator instead of the group of regulator setpoints associated with the time of day.

18. The voltage regulator controller of claim 16 wherein the clock means comprises a real time clock and calendar and wherein the control means selects the group of regulator setpoint responsive to both the time and day and date.

19. The voltage regulator controller of claim 17 further comprising metering means for measuring KVAR hours supplied and consumed by a load coupled to the voltage regulator and storage means coupled to the metering means for storing separate tallies for forward lead KVAR hours, forward lag KVAR hours, reverse lead KVAR hours and reverse lag KVAR hours.

20. The voltage regulator controller of claim 19 further comprising means for determining total lead and lag KVAR hours and for displaying the total lead and lag KVAR hours to an operator of the voltage regulator controller.

21. A method of operating a voltage regulator controller according to claim 1, wherein said controller is coupled to a voltage regulator transformer, further comprising the step of generating respective tap control signals corresponding to said identified regulator control parameters to vary tap position on said voltage regulator transformer.

22. A voltage regulator controller according to claim 8, wherein said controller is coupled to a voltage regulator transformer, further comprising means for generating respective tap control signals corresponding to said identified regulator control parameters to vary tap position on said voltage regulator transformer.

23. A voltage regulator controller according to claim 16, wherein said controller is coupled to a voltage regulator transformer, further comprising means for generating respective tap control signals corresponding to said identified setpoints to vary tap position on said voltage regulator transformer.

* * * * *